US009396425B1

(12) United States Patent
Schattmaier et al.

(10) Patent No.: US 9,396,425 B1

(45) Date of Patent: Jul. 19, 2016

(54) SYSTEMS AND METHODS FOR LOCATING OBJECTS USING RFID TECHNOLOGY AND ALERTING MECHANISMS

(71) Applicants: Steve Schattmaier, Dana Point, CA (US); William Treat, Fayetteville, AR (US); Matthew Shorts, Fanwood, NJ (US)

(72) Inventors: Steve Schattmaier, Dana Point, CA (US); William Treat, Fayetteville, AR (US); Matthew Shorts, Fanwood, NJ (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 5 days.

(21) Appl. No.: 14/605,333

(22) Filed: Jan. 26, 2015

(51) Int. Cl.

| | |
|---|---|
| ***G08B 21/00*** | (2006.01) |
| ***G06K 19/07*** | (2006.01) |
| ***G08B 3/00*** | (2006.01) |
| ***G08B 5/00*** | (2006.01) |
| ***G08B 6/00*** | (2006.01) |
| ***G06K 17/00*** | (2006.01) |

(52) U.S. Cl.
CPC ........ *G06K 19/0724* (2013.01); *G06K 17/0022* (2013.01); *G08B 3/00* (2013.01); *G08B 5/00* (2013.01); *G08B 6/00* (2013.01); *G06K 2017/0045* (2013.01); *G06K 2017/0051* (2013.01)

(58) Field of Classification Search
CPC . G06K 19/0724; G06K 17/0022; G08B 3/00; G08B 5/00; G08B 6/00
USPC ........................................... 340/686.1, 572.1
See application file for complete search history.

(56) References Cited

U.S. PATENT DOCUMENTS

2002/0126010 A1* 9/2002 Trimble ............ G06K 7/10079 340/568.1
2005/0088302 A1* 4/2005 Pucci ................ G08B 13/1427 340/568.1
2007/0285229 A1* 12/2007 Batra ................ G06K 19/0707 340/539.26
2011/0080264 A1* 4/2011 Clare ..................... G01S 13/82 340/10.1
2011/0084840 A1* 4/2011 Mercier ................ G06Q 10/08 340/572.1

* cited by examiner

*Primary Examiner* — Kerri McNally

(74) *Attorney, Agent, or Firm* — Fox Rothschild LLP; Robert J. Sacco; Carol E. Thorstad-Forsyth

(57) ABSTRACT

Systems (100) and methods (400) for an object ($\mathbf{112_1}$) within an area (102). The methods involve: receiving, by a Radio Frequency Identification ("RFID") tag ($\mathbf{114_1}$) coupled to the object, a Radio Frequency ("RF") interrogator signal transmitted from an RFID reader (108); processing, by the RFID tag, the RF interrogator signal to determine if the RF interrogator signal applies thereto; and performing operations by the RFID tag to direct a person's attention directly to the object by activating at least one alerting mechanism (220) electrically and mechanically coupled to the RFID tag when the RF interrogator signal is determined to apply to the RFID tag. In some scenarios, the alerting is additionally or alternatively performed by a beacon (110).

20 Claims, 6 Drawing Sheets

SYSTEMS AND METHODS FOR LOCATING OBJECTS USING RFID TECHNOLOGY AND ALERTING MECHANISMS

FIELD OF THE INVENTION

This document relates generally to Radio Frequency Identification ("RFID") based systems. More particularly, this document relates to systems and methods for locating objects within a facility using RFID technology and alerting mechanisms.

BACKGROUND OF THE INVENTION

RFID technology has conventionally been used in the identification and tracking of products, equipment, and other articles. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

SUMMARY OF THE INVENTION

The present disclosure concerns implementing systems and methods for locating an object within an area. The methods involve: receiving, by an RFID tag coupled to the object, an RF interrogator signal transmitted from an RFID reader; processing, by the RFID tag, the RF interrogator signal to determine if the RF interrogator signal applies thereto; and performing operations by the RFID tag to direct a person's attention directly to the object by activating at least one alerting mechanism electrically and mechanically coupled to the RFID tag when the RF interrogator signal is determined to apply to the RFID tag. The alerting mechanism can include, but is not limited to, an auditory, visual and/or tactile alerting device. A reply signal may be transmitted from the RFID tag which includes information specifying an alert state thereof.

In some scenarios, alerts are output from the alerting mechanism at a frequency which signifies the proximity of the RFID reader to the RFID tag. As such, this frequency may be selected based on received signal strength. The frequency may be adjusted when a distance between the RFID reader and the RFID tag changes. This distance change can be detected based on an increase or decrease of the received signal strength.

In those or other scenarios, at least two alerts of different types are output from the alerting mechanism so as to signify a proximity of the RFID reader to the RFID tag. The type of at least one alert output from the alerting mechanism may be changed when a distance between the RFID reader and the RFID tag changes. Additionally or alternatively, at least one additional alert is output from the alerting mechanism when the distance between the RFID reader and the RFID tag changes.

The present disclosure also concerns systems and methods for determining a general area in which an object is located using beacons. The methods involve: monitoring, by the beacon, communications between the RFID reader and a plurality of RFID tags; detecting, by the beacon, a particular combination of RF interrogator signals and reply signals communicated between an RFID reader and an RFID tag coupled to the object; and performing operations by the beacon to direct a person's attention to the area within which the object is disposed by activating at least one alerting mechanism of the beacon when the particular combination of RF interrogator signals and reply signals is detected thereby. The alerting mechanism includes, but is not limited to, an auditory, visual and/or tactile alerting device.

In some scenarios, alerts are output from the alerting mechanism at a frequency which signifies the proximity of the RFID reader to the beacon. As such, this frequency may be selected based on received signal strength. The frequency may be adjusted when a distance between the RFID reader and the beacon changes. This distance change can be detected based on an increase or decrease of the received signal strength.

In those or other scenarios, at least two alerts of different types are output from the alerting mechanism so as to signify a proximity of the RFID reader to the beacon. The type of at least one alert output from the alerting mechanism may be changed when a distance between the RFID reader and the beacon changes. Additionally or alternatively, at least one additional alert is output from the alerting mechanism when the distance between the RFID reader and the beacon changes.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
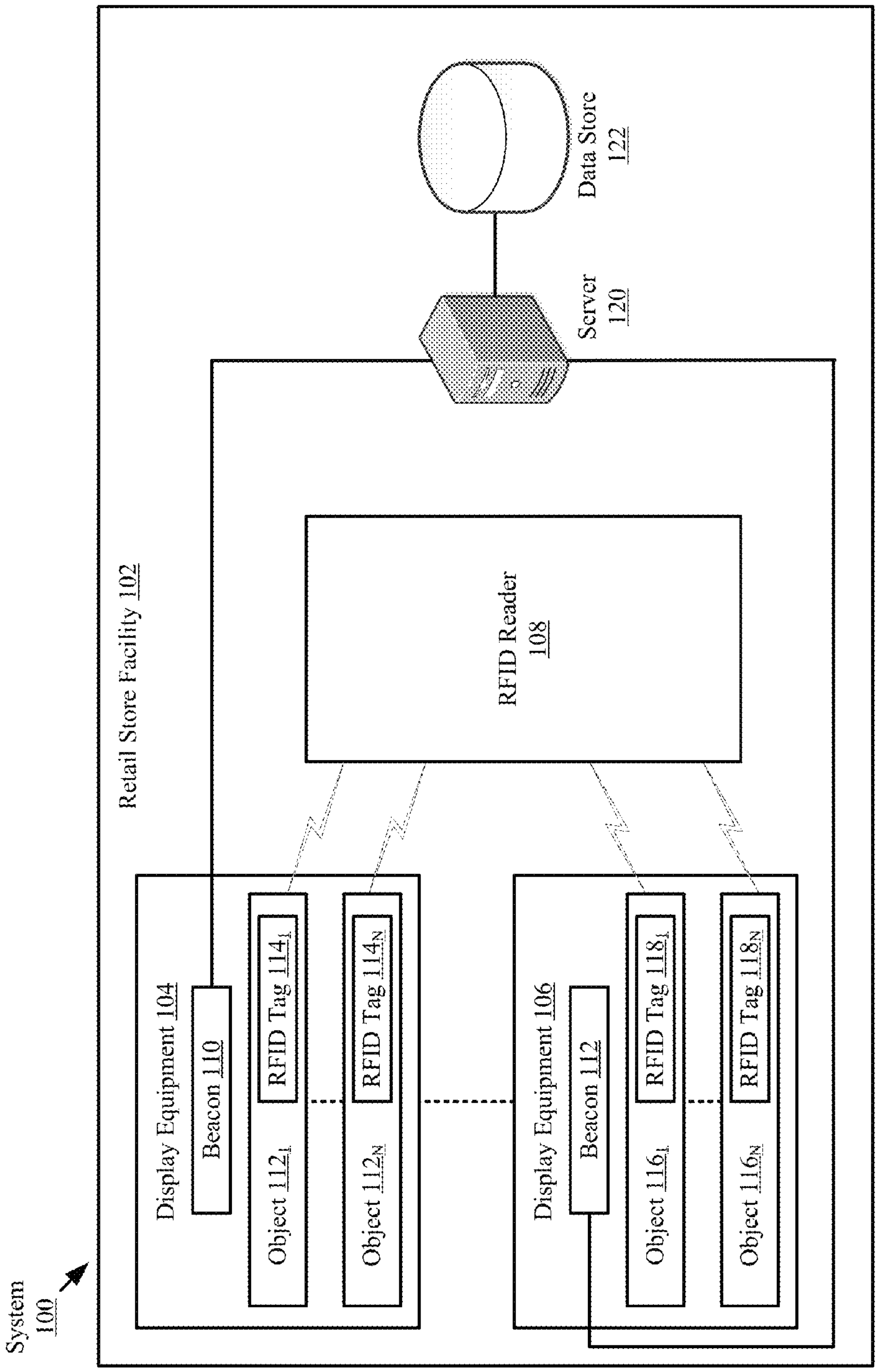
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for locating objects within a facility using RFID technology and alerting mechanisms. The alerting mechanisms greatly aid in locating a particular object by drawing an end user's attention to a specific physical location within a facility. The alerting mechanisms can cover a broad spectrum of feedback to meet the needs of different end user capabilities. The alerting mechanisms can include, but are not limited to, audio output devices, visual output devices (e.g., lights), and/or tactile output devices (e.g., vibrators). The ability to create and activate the alerting mechanisms can be implemented in at least two different ways. For example, the alerting mechanisms can be implemented by a physical RFID tag and/or by an RFID-enabled beacon.

In the physical RFID tag scenarios, additional logic and feedback mechanism are provided with the RFID tag to make locating a particular object easier. Because an RFID reader can communicate with a specific RFID tag or a group of RFID tags, the RFID technology is leveraged to trigger alerting events on the RFID tag itself, making it relatively easy for the end user to locate the same.

In the RFID-enabled beacon scenarios, beacons are placed at strategic locations within the facility (e.g., on shelves or other display equipment). The beacons monitor communications between the RFID reader and the RFID tags. When a beacon detects a particular combination of requests/responses, the beacon activates its alerting mechanism. Because of a limited read-range of the beacon, the beacon can provide alerts to an area of the facility which is being monitored thereby.

By pairing the alerting mechanisms (in either form), an end user is directed to the exact location within a facility at which a given object current resides. Beacons provide a more general area to search for an object, thereby limiting the area of manual searches required to find the object. The RFID tags direct the end user directly to the object's location within a facility, thereby eliminating the need for any manual searches therefore. The alerting mechanisms provide new capabilities to existing RFID devices without significantly increasing the costs thereof and/or changing the deployment requirements thereof.

In addition to facilitating object locating, the alerting mechanisms can also be used for: visually displaying RFID equipment read ranges (e.g., RFID tags and beacons within a read range of a fixed or mobile RFID reader can illuminate to show the limits of the read range); training uses on the capabilities and limits of cycle counting and fixed reader ranges; tuning and testing RFID equipment during deployment exercises; and/or facilitating the identification of unauthorized RFID tag movement (e.g. RFID tags that leave a facility past an RFID read point without authorization can identify themselves following standard EAS alarms, making it easier for store personnel to identify the suspect item).

Referring now to FIG. 1, there is provided a schematic illustration of an exemplary system 100 that is useful for understanding the present invention. The system 100 is generally configured to allow improved object locating within a retail store environment using RFID communication technology. Although the present invention is described herein in relation to a retail store environment, it is not limited in this regard. The present invention can be employed in any environment in which objects need to be located and/or tracked.

As shown in FIG. 1, system 100 comprises a Retail Store Facility ("RSF") 102 in which display equipment 104, 106 is disposed. The display equipment is provided for displaying objects $\mathbf{112}_1$-$\mathbf{112}_N$, $\mathbf{116}_1$-$\mathbf{116}_N$ to customers of the retail store. The display equipment can include, but is not limited to, shelves, article display cabinets, promotional displays, fixtures and/or equipment securing areas of the RSF 102. Beacons 110, 112 are also disposed on the display equipment 104, 106. The beacons comprise alerting circuitry for assisting store personnel with locating objects within the RSF 102. The manner in which the beacons provide such assistance will become evident as the discussion progresses. Notably, the beacons may comprise wireless, self-contained devices that can be put at locations in the RSF without any external connections. In addition, if external connectivity were available for power or networking, it may be used even though not required by the beacons.

RFID tags $\mathbf{114}_1$-$\mathbf{114}_N$, $\mathbf{118}_1$-$\mathbf{118}_N$ are respectively coupled to the objects $\mathbf{112}_1$-$\mathbf{112}_N$, $\mathbf{116}_1$-$\mathbf{116}_N$. The RFID tags are described herein as comprising single-technology tags that are only RFID enabled. The present invention is not limited in this regard. The RFID tags can alternatively or additionally comprise dual-technology tags that have both EAS and RFID capabilities. In all scenarios, the RFID tags comprise alerting circuitry for assisting store personnel with locating objects within the RSF 102. The manner in which the RFID tags provide such assistance will become evident as the discussion progresses.

Figure 2:
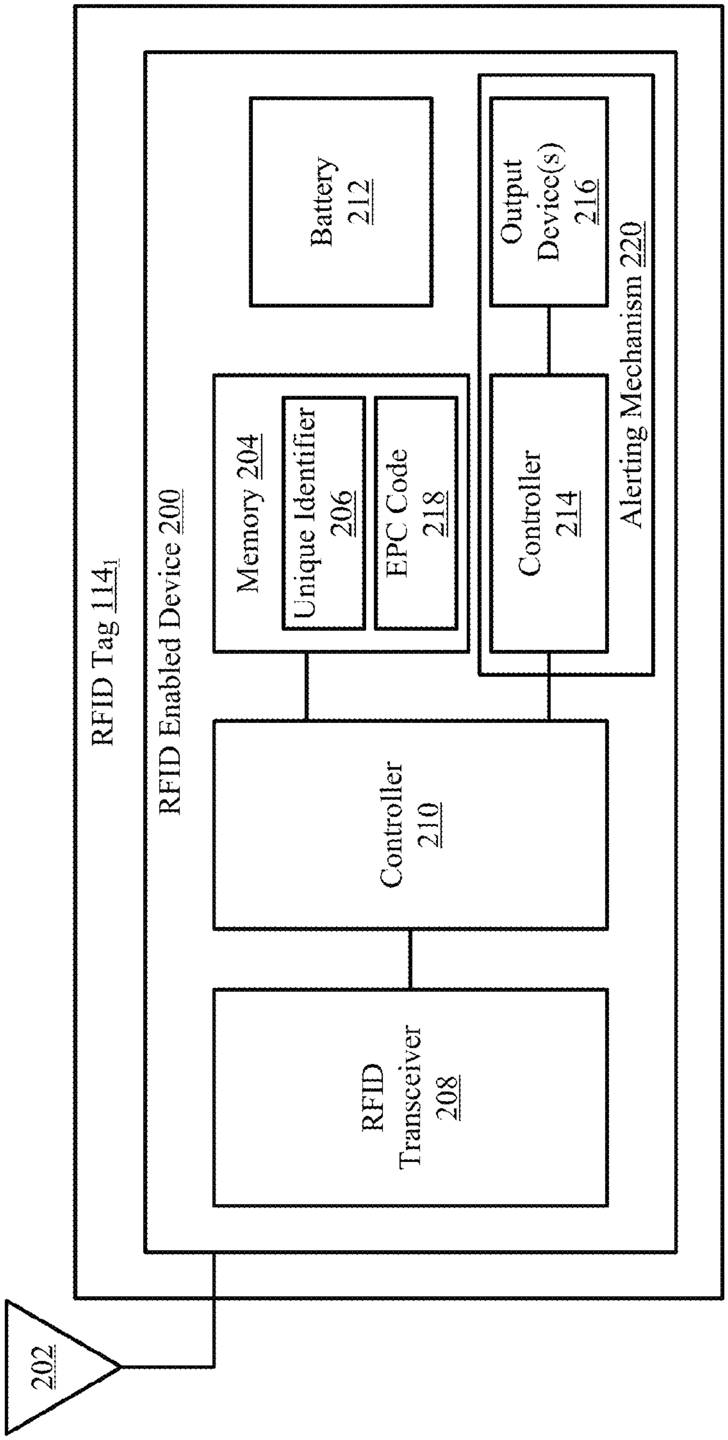
FIG. 2 is a block diagram of an exemplary architecture for an RFID tag shown in FIG. 1.

A detailed block diagram of RFID tag 114$_1$ is provided in FIG. 2. RFID tags 114$_N$, 118$_1$-118$_N$ are the same as or similar to RFID tag 114$_1$. As such, the discussion of RFID tag 114$_1$ is sufficient for understanding the other RFID tags 114$_N$, 118$_1$-118$_N$. RFID tag 114$_1$ may include more or less components that that shown in FIG. 2. However, the components shown are sufficient to disclose an illustrative embodiment implementing the present invention. Some or all of the components of the RFID tag 114$_1$ can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative RFID tag 114$_1$ configured to facilitate improved object locating within an RSF 102. In this regard, the RFID tag 114$_1$ comprises an RFID enabled device 200 for allowing data to be exchanged with an external device (e.g., RFID reader 108 of FIG. 1) via RFID technology. The components 204-218 shown in FIG. 2 may be collectively referred to herein as the RFID enabled device 200, and include a power source 212 (e.g., a battery).

The RFID enabled device 200 comprises an antenna 202 for allowing data to be exchanged with the external device via RFID technology. The external device may comprise RFID reader 108 of FIG. 1. RFID reader 108 may be a fixed RFID reader or a portable RFID reader (e.g., a handheld RFID reader). In this case, the antenna 202 is configured to receive RF carrier signals (or interrogation signals) from the RFID reader 108 and/or transmit data response signals (or authentication reply signals) generated by the RFID enabled device 200. In this regard, the RFID enabled device 200 comprises an RFID transceiver 208. RFID transceivers are well known in the art, and therefore will not be described herein. However, it should be understood that the RFID transceiver 208 receives RF carrier signals (or interrogator signals) including first information from RFID readers, and forwards the same to a logic controller 210 for extracting the first information therefrom. If the first information indicates that the RF request signal (or interrogator signal) was directed to the RFID tag 114$_1$ or a group to which the RFID tag 114$_1$ belongs, then the logic controller 210 generates a data response signal (or authentication reply signal) encoded with second information stored in a memory 204. The second information can include, but is not limited to, a unique identifier 206 of the RFID tag 114$_1$ and/or an EPC 218 associated with an object to which the RFID tag 114$_1$ is affixed. The data response signal (or authentication reply signal) is transmitted from the RFID tag 114$_1$ to the RFID reader via RFID transceiver 208 and antenna 202.

The RFID tag 114$_1$ also comprises an alerting mechanism 220. The alerting mechanism 220 provides a means for assisting store personnel with locating the object 112$_1$ (to which it is attached) within the RSF 102. In this regard, the alerting mechanism 220 includes a controller 214 and output devices 216 for outputting auditory, visual and/or tactile alerts. The output devices 216 can include, but are not limited to, speakers, Light Emitting Diodes (LEDs), and vibrators. At least one alert is output from output device(s) 216 when the RFID tag receives an RF request signal (or interrogator signal) from an RFID reader that is directed thereto or to a group of RFID tags to which it belongs. The alert directs the store personnel's attention directly to the object to which the RFID tag 114$_1$ is attached. In effect, the store personnel does not need to manually access each RFID tag in the RSF for purposes of finding RFID tag 114$_1$. As such, the amount of time necessary to find a particular object within the RSF is significantly reduced. Also, the store personnel's ability to find the particular object is much easier as compared to that when using conventional inventory tracking systems. Notably, the alert can be terminated under certain conditions. These conditions may either be configured within the device (e.g., time out configured) or occur when the RFID tag 114$_1$ is no longer in the read field of the RFID reader. In some scenarios, the alert continues until expiration of a time period even when the RFID tag 114$_1$ is no longer in the read field of the RFID reader. When the RFID tag 114$_1$ is in the read field of the RFID reader, the alert may only be terminated in response to a termination command or signal.

The Air Interface Protocol ("AIP") standard defines the method by which RFID readers communicate with compliant RFID tags. The controller 214 is operative to interface with existing RFID tag's electrical circuitry, as well as understand when the RFID tag is communicating with a requesting RFID reader. Based on whether or not the RFID tag 114$_1$ is being requested by the RFID reader 108, the controller 214 may perform operations to cause the output devices 216 to be enabled or activated so as to draw the attention of store personnel thereto. Depending upon the various data points available to controller 214 (e.g., power level, signal strength and/or read frequency), the frequency at which alerts are outputs from the alerting mechanism 220 can be throttled up/down. Also, different combinations of alerts can be output from the alerting mechanism 220 so as to signify the store personnel's physical proximity to the RFID tag 114$_1$. For example, if the RFID tag 114$_1$ is near a far end of a read field, then the signal power of the RF request signal (or interrogator signal) received thereat is relatively low. In this case, the store employee is considered to be relatively far away from the RFID tag 114$_1$. Consequently, an auditory alert and/or a visual alert is(are) selectively output by the alerting mechanism 220, but a tactile alert is not. As received power increases (signifying that the store personnel is approaching the RFID tag), the frequency at which the auditory alert and/or visual alert are output is increased. Also, additional alerts may be output from the alerting mechanism 220, such as a tactile alert.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Figure 3:
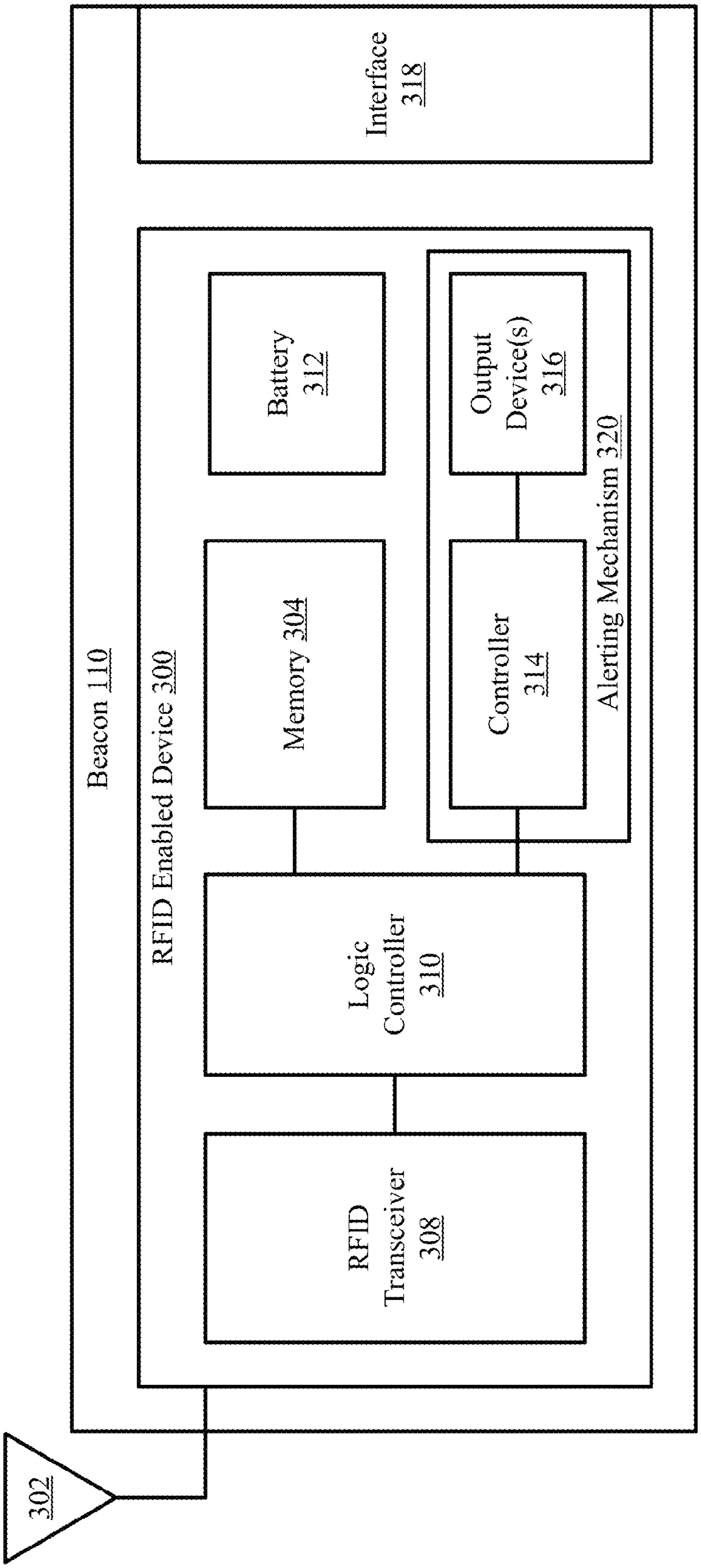
FIG. 3 is a block diagram of an exemplary architecture for a beacon shown in FIG. 1.

Referring now to FIG. 3, there is provided a schematic illustration of an exemplary architecture for beacon 110 of FIG. 1. Beacon 112 of FIG. 1 is the same as or similar to beacon 110. As such, the following discussion of beacon 110 is sufficient for understanding beacon 112. Beacon 110 can include more or less components than that shown in FIG. 3.

However, the components shown are sufficient to disclose an illustrative embodiment implementing the present invention. Some or all of the components of the beacon 110 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

Notably, the beacon 110 comprises RFID and alerting circuitry similar to the RFID tags $\mathbf{114}_1$ described above. Accordingly, the beacon 110 provides a means to facilitate locating a general area of an RSF within which a particular object resides. The beacon 110 may also be used to decouple the alerting functionality from the RFID tags, so that RFID enabled swing tickets (or hang tags) can be used with a particular deployment (whereby the need to deploy RFID tags with alerting mechanisms on all objects within the RSF is eliminated).

In view of the forgoing, the hardware architecture of FIG. 3 represents an embodiment of a representative beacon 110 configured to facilitate improved object locating within an RSF 102. In this regard, the beacon 110 comprises an SRC enabled device 300 for allowing data to be exchanged with an external device (e.g., RFID tags $\mathbf{114}_1$-$\mathbf{114}_N$, RFID reader 108, and/or server 120 of FIG. 1) via RFID technology. The components 304-316 shown in FIG. 3 may be collectively referred to herein as the RFID enabled device 300, and include a power source 312 (e.g., a battery) and memory 304. Memory 304 may be a volatile memory and/or a non-volatile memory. For example, the memory 304 can include, but is not limited to, RAM, DRAM, SRAM, ROM and flash memory. The memory 304 may also comprise unsecure memory and/or secure memory.

The RFID enabled device 300 comprises an antenna 302 for allowing data to be exchanged with the external device via RFID technology. The antenna 302 is configured to receive RFID signals from the external device and/or transmit RFID signals generated by the RFID enabled device 300. The RFID enabled device 300 comprises an RFID transceiver 304. RFID transceivers are well known in the art, and therefore will not be described herein. However, it should be understood that the RFID transceiver 304 receives RFID carrier signals transmitted from RFID readers (e.g., RFID reader 108 of FIG. 1) and receives data response signals (or authentication reply signal) transmitted from RFID tags (e.g., RFID tags $\mathbf{114}_1$-$\mathbf{114}_N$ of FIG. 1). In this way, the beacon 110 can monitor communications between RFID readers and RFID tags.

Information associated with monitoring such communications can be stored in memory 304 of the RFID enabled device 300 and/or communicated to other external devices (e.g., server 120 and data store 122 of FIG. 1) via interface 318. For example, the beacon can communicate information specifying the combination of RF requests/responses that it has detected to a server. The server can then store the information in a database so as to collect historical data. The historical data can be subsequently used to determine the last known position of a particular object within the RSF, or better locating the particular object in response to a future request.

The beacon 110 also comprises an alerting mechanism 320. The alerting mechanism 320 provides a means for assisting store personnel with locating a general area of a facility within which one or more objects is(are) disposed. In this regard, the alerting mechanism 320 includes a controller 314 and output devices 316 for outputting auditory, visual and/or tactile alerts. The output devices 316 can include, but are not limited to, speakers, LEDs, and vibrators. At least one alert is output from output device(s) 316 when certain criteria are met. The criteria can be provided by server 120 of FIG. 1. The criteria can include, but is not limited to, detection of RF requests/response between an RF reader and an RFID tag associated with a particular type or category of object (e.g., a red sweeter).

For example, let's assume that the beacon 110 detects a particular combination of requests/responses communicated between an RFID reader and at least one RFID tag. Upon such detection, the beacon 110 outputs at least one auditory, visual and/or tactile alert. The alert directs the store personnel's attention directly to the general area of the RSF in which at least one object is located. In effect, the amount of RFID tags which store personnel need to manually access for purposes of finding a particular object is significantly reduced (as compared to when the beacon alerting is not employed). As such, the amount of time necessary to find a particular object within the RSF is significantly reduced. Also, the store personnel's ability to find the particular object is much easier as compared to that when using conventional inventory tracking systems.

Using the AIP standard, the beacon 110 simply listens to RFID traffic that is detected by its antenna 302. Alert outputs are triggered when a series of events occur that indicate that the RFID tag(s) being searched for by store personnel via an RFID reader are nearby. This is typically a combination of read requests and responses to read requests. As with the RFID tags above, a combination and frequency of alerting can be varied based on various data points available to the beacon 110.

Figure 4:
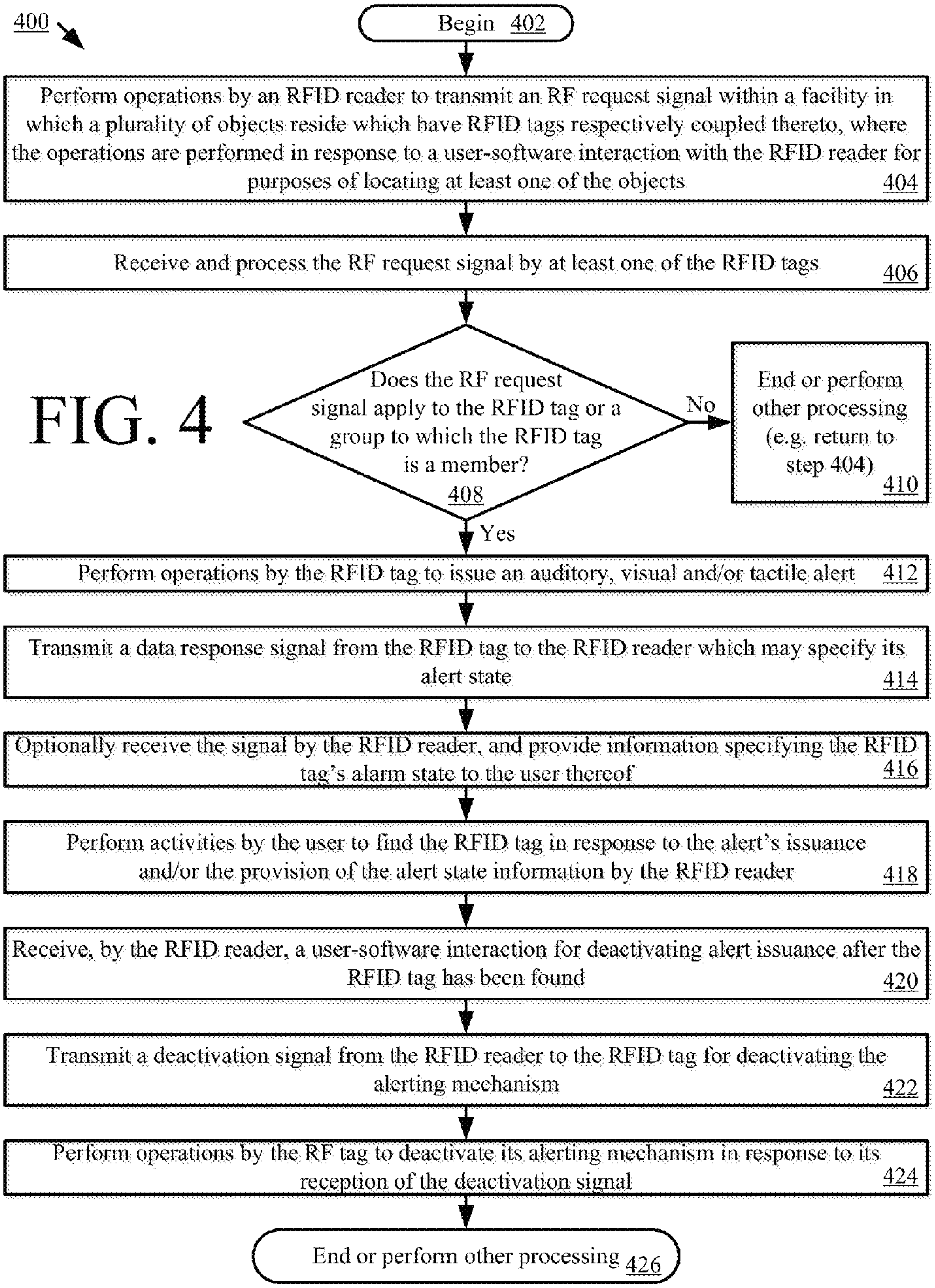
FIGS. 4-5 each provide a flow diagram of an exemplary method for locating an object within a facility using RFID technology.

Referring now to FIG. 4, there is provided a flow diagram of an exemplary method 400 for locating an object (e.g., object $\mathbf{112}_1$ or $\mathbf{112}_N$ of FIG. 1) within a facility (e.g., RSF 102 of FIG. 1). The object has an RFID tag (e.g., RFID tag $\mathbf{114}_1$ or $\mathbf{114}_N$ of FIG. 1) coupled thereto. Method 400 begins with step 402 and continues with step 404 where operations are performed by an RFID reader (e.g., RFID reader 108 of FIG. 1) to transmit an RF request signal (or interrogator signal) within the facility. These operations are performed in response to a user-software interaction with the RFID reader for purposes of locating at least one of the objects. The RF request signal (or interrogator signal) is received and processed by the RFID tag in step 406. The processing involves determining if the RF request signal (or interrogator signal) applies to the RFID tag or a group of RFID tags to which the RFID tag belongs.

If the RF request signal (or interrogator signal) does not apply to the RFID tag or the group of RFID tags [408:NO], then step 410 is performed where method 400 ends or other processing is performed (e.g., return to step 404). In contrast, if the RF request signal (or interrogator signal) does apply to the RFID tag or the group of RFID tags [408:YES], then steps 412-424 are performed. These steps involve performing operations by the RFID tag to issue an auditory, visual and/or tactile alert. The alert can be a continuous alert (e.g., a continuous noise or emitted light) or a periodic alert occurring at regular or irregular intervals. In the periodic alert scenario, the frequency at which the alert is issued is selected based on a power level (or signal strength) of the received RF request signal (or interrogator signal) and/or other criteria. Also, two or more types of alerts may be concurrently or simultaneously issued. The particular combination of alerts is selected based on the received RF request signal (or interrogator signal) and/or other criteria. In this way, the alert frequency and/or types provide a means to signify a person's physical proximity to the RFID tag.

Steps 412-424 also involve: transmitting a data response signal (or authentication reply signal) from the RFID tag to the RFID reader which may specify its alert state; optionally receiving the data response signal (or authentication reply signal) by the RFID reader; optionally providing information specifying the RFID tag's alert state to the user thereof; performing activities by the user to find the RFID tag in response to the alert's issuance and/or the provision of the alert state information by the RFID reader; receiving by the RFID reader a user-software interaction for deactivating alert issuance after the RFID tag has been found; transmitting a deactivation signal from the RFID reader to the RFID tag for deactivating the alerting mechanism (e.g., alerting mechanism 220 of FIG. 2); and performing operations by the RFID tag to deactivate its alerting mechanism in response to its reception of the deactivation signal. Subsequent to completing step 424, step 426 is performed where method 400 ends or other processing is performed.

Figure 5:
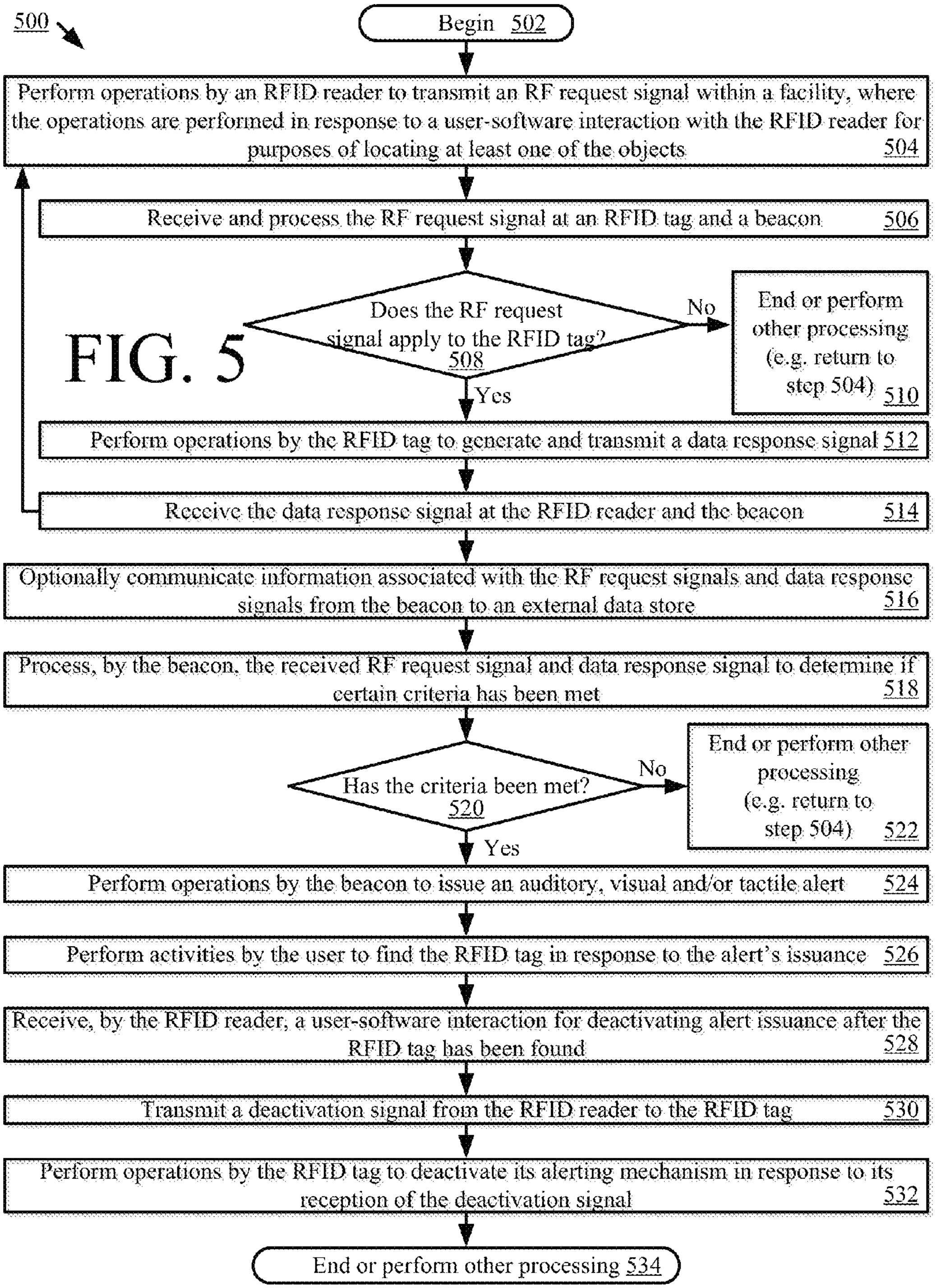

Referring now to FIG. 5, there is provided a flow diagram an exemplary method 500 for locating an object (e.g., object $\mathbf{112}_1$ or $\mathbf{112}_N$ of FIG. 1) within a facility (e.g., RSF 102 of FIG. 1). The object has an RFID tag (e.g., RFID tag $\mathbf{114}_1$ or $\mathbf{114}_N$ of FIG. 1) coupled thereto. Method 500 begins with step 502 and continues with step 504 where operations are performed by an RFID reader (e.g., RFID reader 108 of FIG. 1) to transmit an RF request signal (or interrogator signal) within the facility. These operations are performed in response to a user-software interaction with the RFID reader for purposes of locating at least one of the objects. The RF request signal (or interrogator signal) is received and processed by the RFID tag and a beacon (e.g., beacon 110 of FIG. 1) in step 506. The processing involves determining if the RF request signal (or interrogator signal) applies to the RFID tag.

If the RF request signal (or interrogator signal) does not apply to the RFID tag [508:NO], then step 510 is performed where the method 500 ends or other processing is performed (e.g., return to step 504). In contrast, if the RF request signal (or interrogator signal) does apply to the RFID tag [508: YES], then steps 512-514 are performed. These steps involve: generating by and transmitting from the RFID tag a data response signal (or authentication reply signal); and receiving the data response signal (or authentication reply signal) at the RFID reader and the beacon.

It should be emphasized here that the beacon received the RF request signal (or interrogator signal) in step 506 and the data response signal (or authentication reply signal) in step 506. In this way, the beacon monitors the communications between the RFID reader and the RFID tag. As a result of this monitoring, various operations are performed by the beacon to assist a person in locating the particular object. These operations are performed in steps 516-524. As shown by steps 516-518, the beacon: optionally communicates information associated with the RF request signals (or interrogator signal) and data response to an external device (e.g., server 120 of FIG. 1); processes the received RF request signal (or interrogator signal) and data response signal (or authentication reply signal) to determine if certain criteria has been met. The criteria can include, but is not limited to, detection of RF requests/response between an RF reader and an RFID tag associated with a particular type or category of object (e.g., a red sweeter).

If the criteria has not been met [520:NO], then step 522 is performed where method 500 ends or other processing is performed (e.g., return to step 504). In contrast, if the criteria is met [520:YES], then step 524 is performed where the beacon issues an auditory, visual and/or tactile alert. The alert can be a continuous alert (e.g., a continuous noise or emitted light) or a periodic alert occurring at regular or irregular intervals. In the periodic alert scenario, the frequency at which the alert is issued is selected based on a power level (or signal strength) of the received RF request signal (or interrogator signal) and/or other criteria. Also, two or more types of alerts may be concurrently or simultaneously issued. The particular combination of alerts is selected based on the received RF request signal (or interrogator signal) and/or other criteria. In this way, the alert frequency and/or types provide a means to signify a person's physical proximity to the RFID tag.

In response to the alert's issuance, the user performs activities in step 526 to find the RFID tag. After the RFID tag has been found, the user performs a user-software interaction with the RFID reader for deactivating alert issuance, as shown by step 528. In a next step 530, the RFID reader transmits a deactivation signal from the RFID reader to the RFID tag. Upon receipt of the deactivation signal, the RFID tag deactivates the alerting mechanism (e.g., alerting mechanism 320 of FIG. 3) in step 532. Subsequently, step 534 is performed where method 500 ends or other processing is performed.

Figure 6:
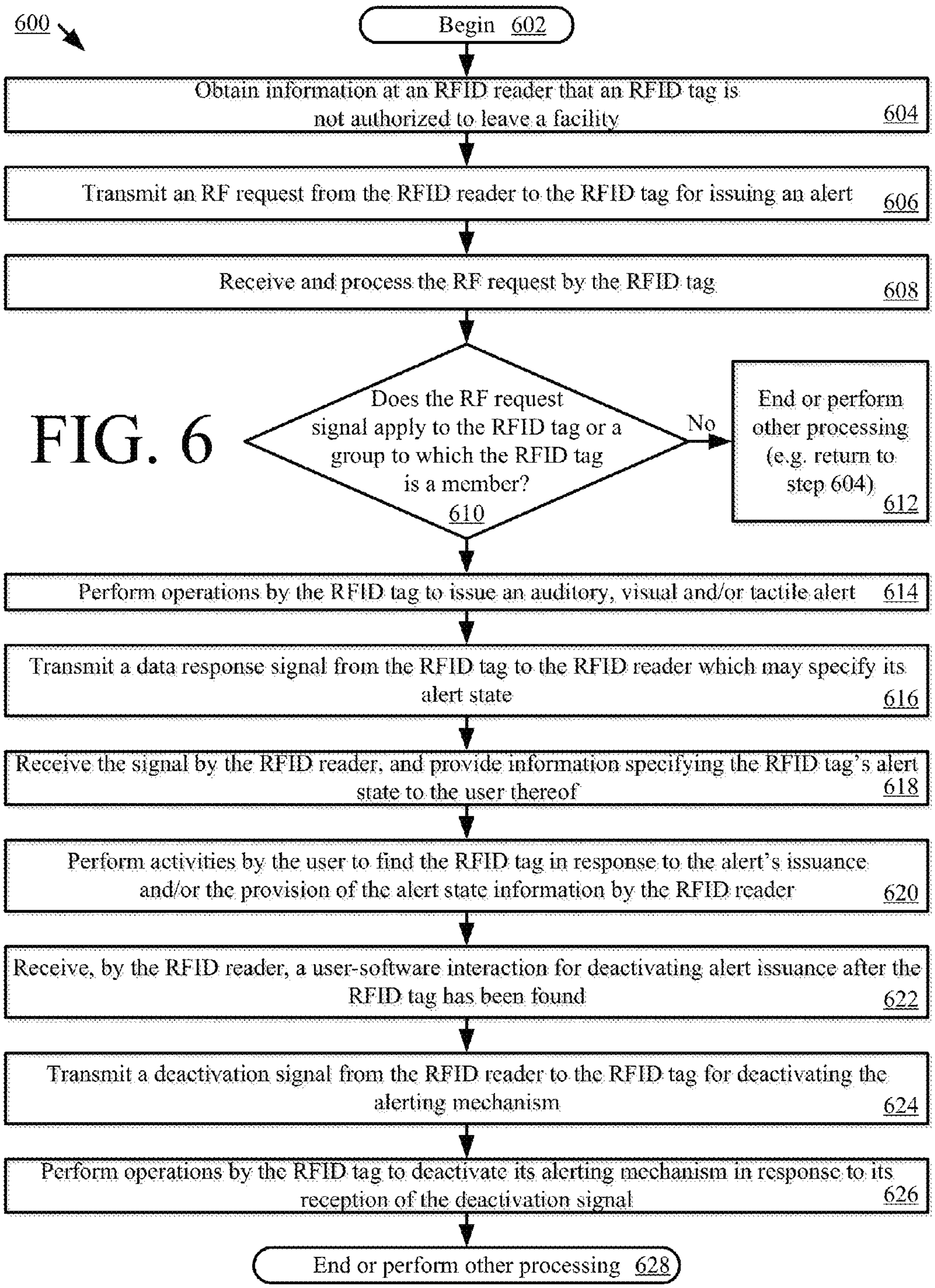
FIG. 6 is a flow diagram of an exemplary method for handling scenarios in which objects are being moved in unauthorized manners.

Referring now to FIG. 6, there is provided a flow diagram of an exemplary method 600 for handling scenarios in which objects (e.g., object $\mathbf{112}_1$ or $\mathbf{112}_N$ of FIG. 1) are being moved in unauthorized manners. The objects each have an RFID tag (e.g., RFID tag $\mathbf{114}_1$ or $\mathbf{114}_N$ of FIG. 1) coupled thereto. Method 600 begins with step 602 and continues with step 604 where and RFID reader (e.g., RFID reader 108 of FIG. 1) obtains information that an RFID tag is not authorized to leave a facility. In response to this information, the RFID reader transmits an RF request signal (or interrogator signal) to an RFID tag for issuing an alert, as shown by step 606. The RF request signal (or interrogator signal) is received and processed by the RFID tag in step 608. This processing can involve determining if the RF request signal (or interrogator signal) applies to the RFID tag or a group of RFID tags to which the RFID tag belongs.

If the RF request signal (or interrogator signal) does not apply to the RFID tag or a group of RFID tags to which the RFID tag belongs [610:NO], then step 612 is performed where method 600 ends or other processing is performed. In contrast, if the RF request signal (or interrogator signal) does apply to the RFID tag or a group of RFID tags to which the RFID tag belongs [610:YES], then steps 614-616 are performed by the RFID tag. These steps involve: performing operations by the RFID tag to issue an auditory, visual and/or tactile alert; and transmitting a data response signal (or authentication reply signal) from the RFID tag to the RFID reader which may specify its alert state. The data response signal (or authentication reply signal) is then received by the RFID reader in step 618. In response to the data response signal (or authentication reply signal), the RFID reader provides information specifying the RFID tag's alert state to the user thereof.

The user then performs activities in step 620 to find the RFID tag. After the RFID tag has been found, the user performs user-software interactions with the RFID reader for deactivating alert issuance, as shown by step 622. In turn, step 624 is performed where the RFID reader transmits a deactivation signal to the RFID tag for deactivating the alerting mechanism (e.g., alerting mechanism 220 of FIG. 2). In response to the reception of the deactivation signal, the RFID tag deactivates the alerting mechanism in step 626. Subsequently, step 628 is performed where method 600 ends or other processing is performed.

Notably, in some scenarios, only one of the methods 400 and 500 is employed within an RSF. In other scenarios, both methods 400 and 500 are employed simultaneously or concurrently within an RSF. For example, let's assume a store employee is trying to find a particular object in the RSF. Accordingly, the store employee uses an RFID reader to communicate with the RFID tags in the RSF for purposes of issuing alarms indicting where in the RSF the object is located. When a beacon and/or an applicable RFID tag(s) receive(s) an RF request signal (or interrogator signal) from the RFID reader, it(they) issue(s) alarms. The alarm issued by the beacon directs the store employee to the display equipment in the general area where the object is located. The alarm issued by the RFID tag directs the store employee directly to the object when (s)he is in the general area within which the object resides.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for locating an object within an area, comprising:

receiving, by a Radio Frequency Identification ("RFID") tag coupled to the object, a Radio Frequency ("RF") interrogator signal transmitted from an RFID reader;

processing, by the RFID tag, the RF interrogator signal to determine if the RF interrogator signal applies thereto;

selecting, by the RFID tag, a number of alerts to be issued and at least one alert type from a plurality of different alert types based on at least one characteristic of the RF interrogator signal, said plurality of different alert types comprising a visual alert type, an auditory alert type and a tactile alert type; and performing operations by the RFID tag to direct a person's attention directly to the object by activating at least one alerting mechanism electrically and mechanically coupled to the RFID tag when the RF interrogator signal is determined to apply to the RFID tag, where activation of the at least one alerting mechanism causes the selected number of alerts of the selected alert type to be issued;

wherein at least one of the number of alerts to be issued and the alert type issued during an object locating process is modified based on changes of the at least one characteristic of the RF interrogator signal.

2. The method according to claim 1, wherein the alerting mechanism comprises an auditory, visual or tactile alerting device.

3. The method according to claim 1, further comprising outputting alerts from the alerting mechanism at a frequency which signifies a proximity of the RFID reader to the RFID tag.

4. The method according to claim 3, further comprising selecting the frequency at which the alerts are to be output from the alerting mechanism based on a received signal strength.

5. The method according to claim 1, further comprising changing a frequency at which alerts are output from the alerting mechanism when a distance between the RFID reader and the RFID tag changes.

6. The method according to claim 1, further comprising changing a frequency at which alerts are output from the alerting mechanism when a received signal strength increases or decreases.

7. The method according to claim 1, further comprising outputting at least two alerts of different types from the alerting mechanism so as to signify a proximity of the RFID reader to the RFID tag.

8. The method according to claim 1, further comprising changing a type of at least one alert output from the alerting mechanism when a distance between the RFID reader and the RFID tag changes.

9. The method according to claim 1, further comprising outputting at least one additional alert from the alerting mechanism when a distance between the RFID reader and the RFID tag changes.

10. The method according to claim 1, further comprising transmitting a reply signal from the RFID tag which includes information specifying an alert state thereof.

11. A method for locating an object within an area, comprising:

detecting, by a beacon, a particular combination of Radio Frequency ("RF") interrogator signals and reply signals communicated between an RFID reader and an RFID tag coupled to the object;

selecting, by the beacon, a number of alerts to be issued and at least one alert type from a plurality of different alert types based on at least one characteristic of the RF interrogator signal, said plurality of different alert types comprising a visual alert type, an auditory alert type and a tactile alert type; and performing operations by the beacon to direct a person's attention to the area within which the object is disposed by activating at least one alerting mechanism of the beacon when the particular combination of RF interrogator signals and reply signals is detected thereby, where activation of the at least one alerting mechanism causes the selected number of alerts of the selected alert type to be issued;

wherein at least one of the number of alerts to be issued and the alert type issued during an object locating process is modified based on changes of the at least one characteristic of the RF interrogator signal.

12. The method according to claim 11, wherein the alerting mechanism comprises an auditory, visual or tactile alerting device.

13. The method according to claim 11, further comprising outputting alerts from the alerting mechanism at a frequency which signifies a proximity of the RFID reader to the beacon.

14. The method according to claim 13, further comprising selecting the frequency at which the alerts are to be output from the alerting mechanism based on a received signal strength.

15. The method according to claim 11, further comprising changing a frequency at which alerts are output from the alerting mechanism when a distance between the RFID reader and the beacon changes.

16. The method according to claim 11, further comprising changing a frequency at which alerts are output from the alerting mechanism when a received signal strength increases or decreases.

17. The method according to claim 11, further comprising outputting at least two alerts of different types from the alerting mechanism so as to signify a proximity of the RFID reader to the beacon.

18. The method according to claim 11, further comprising changing a type of at least one alert output from the alerting mechanism when a distance between the RFID reader and the beacon changes.

19. The method according to claim 11, further comprising outputting at least one additional alert from the alerting mechanism when a distance between the RFID reader and the beacon changes.

20. The method according to claim 11, further comprising monitoring, by the beacon, communications between the RFID reader and a plurality of RFID tags.

* * * * *